US005974170A

United States Patent [19]
Louis et al.

[11] Patent Number: 5,974,170
[45] Date of Patent: Oct. 26, 1999

[54] METHOD OF DETECTING RELIEF CONTOURS IN A PAIR OF STEREOSCOPIC IMAGES

[75] Inventors: Christian Louis, Orsay; Yves Lechervy, Evry, both of France

[73] Assignee: Alcatel, Paris, France

[21] Appl. No.: 09/035,365

[22] Filed: Mar. 5, 1998

[30] Foreign Application Priority Data

Mar. 6, 1997 [FR] France ................................. 97 02674

[51] Int. Cl.$^6$ .................................................. G06K 9/00
[52] U.S. Cl. ........................................ 382/154; 382/113
[58] Field of Search ........................... 382/154, 113; 348/42, 47, 135, 140, 26; 396/324–331; 356/2; 434/152; 345/421

[56] References Cited

U.S. PATENT DOCUMENTS

| | | | |
|---|---|---|---|
| 3,928,925 | 12/1975 | Gar, Jr. ................................... | 434/152 |
| 3,943,344 | 3/1976 | Kidode et al. . | |
| 4,009,961 | 3/1977 | Maruyama .................................. | 356/2 |
| 5,309,522 | 5/1994 | Dye . | |

OTHER PUBLICATIONS

Construction of Intermediate Pictures for a Multiview 3D System, Liu et al., Stereoscopic Displays and Applications III, SPIE vol. 1669, pp. 10–17, 1992.

Min S. Kang et al, "Recovering an Elevation Map by Stereo Modeling of the Aerial Image Sequence", Optical Engineering, vol. 33, No. 11, Nov. 1, 1994, pp. 3793–3802, XP000475122.

I. S. Kweon et al., "Extracting Topographic Terrain Features from Elevation Maps", CVGIP Image Understanding, vol. 59, No. 2, Mar. 1, 1994, pp. 171, 182, XP000439838.

*Primary Examiner*—Joseph Mancuso
*Assistant Examiner*—Vikkram Bali
*Attorney, Agent, or Firm*—Sughrue, Mion, Zinn, Macpeak & Seas, PLLC

[57] ABSTRACT

A method of detecting relief contours in digital images representing an aerial or satellite view of the ground includes the steps of calculating a digital elevation map from two stereoscopic images of the terrain, extracting crest lines in the digital map, projecting the crest lines into one of the stereoscopic images, calculating contours in the image and deciding that a contour is a relief contour if the distance to the closest projected crest line, in the sense of a particular affinity criterion, is below a particular threshold.

5 Claims, 3 Drawing Sheets

METHOD OF DETECTING RELIEF CONTOURS IN A PAIR OF STEREOSCOPIC IMAGES

BACKGROUND OF THE INVENTION

1. Field of the Invention

The present invention concerns a method of detecting relief contours in digital images representing an aerial or satellite view of the ground. An application of the method constructs accurate crest lines on a digital elevation map.

2. Description of the Prior Art

Contour detection is a standard problem in image analysis and there are many techniques available. However, these prior art techniques do not address themselves to the nature of the contours and in particular cannot distinguish contours representing relief discontinuities (typically crest lines) from texture contours (for example the boundary between a cultivated field and a forest).

There are many applications of a method of distinguishing relief contours and texture contours. One example is detecting man-made structures in aerial or satellite images. These structures are generally characterized in that they have sharp edges (i.e. crest lines) which can be located to detect the contours of the structure. The prior art methods are evidently insufficient to solve this kind of problem.

The present invention alleviates this insufficiency and proposes a method of analyzing images capable of detecting only contours marking crest lines, exclusively.

For this the method of the invention requires two calibrated stereoscopic images of the same terrain, i.e. two images of the same terrain taken with different but known imaging parameters.

SUMMARY OF THE INVENTION

The method of the invention applies to one of the two images and includes the following steps:

calculating a digital map of the terrain, extracting crest lines in said digital map, projecting said crest lines into one of said stereoscopic images, calculating contours in said image, and deciding that a contour is a relief contour if the distance to the closest projected crest line, in the sense of a particular affinity criterion, is below a particular threshold.

As previously indicated, one application of the invention is constructing precise crest lines for digital elevation maps. The process of constructing a digital elevation map implies many interpolations and as a result its accuracy is very much degraded compared to that of the images used to construct it.

Some applications are based on using crest lines for extracting objects in digital elevation maps, in particular man-made structures. It is therefore indispensable for such crest lines to have the best possible accuracy.

The method of the invention constructs crest segments on the digital elevation map with the same accuracy as the original images.

To achieve this the method of detecting relief contours in accordance with the invention is applied to each of said stereoscopic images and is followed by a step of generating crest segments from said contours.

The various features and advantages will become more clearly apparent in the following description with reference to the appended drawings.

DETAILED DESCRIPTION OF THE PREFERRED EMBODIMENTS

Figure 2:
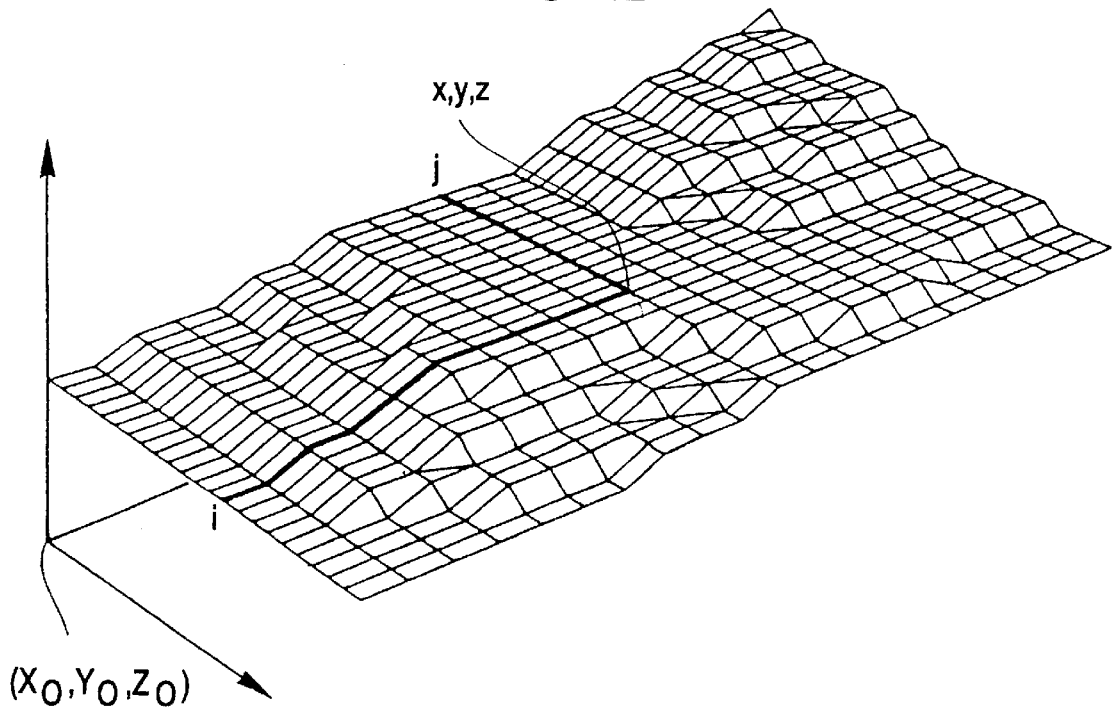
FIG. 2 shows one example of a digital elevation map (DEM).

FIG. 2 shows one example of a digital elevation map. A digital elevation map (DEM) is a concept well known in the art of three-dimensional (3D) imaging. It is a sampled matrix representation of terrain in which a height h(i, j) is associated with each point with coordinates i, j.

The equations relating the coordinates i and j in the digital elevation map and the coordinates x, y and z in the real 3D world are:

$$x = X_0 + i \times \Delta_x$$

$$y = Y_0 + j \times \Delta_y$$

$$z = h(i, j)$$

where $X_0$ and $Y_0$ represent the coordinates of the origin point of the digital elevation map and $\Delta_x$ and $\Delta_y$ represent the real distances between two samples in the two directions of the terrain.

Figure 1:
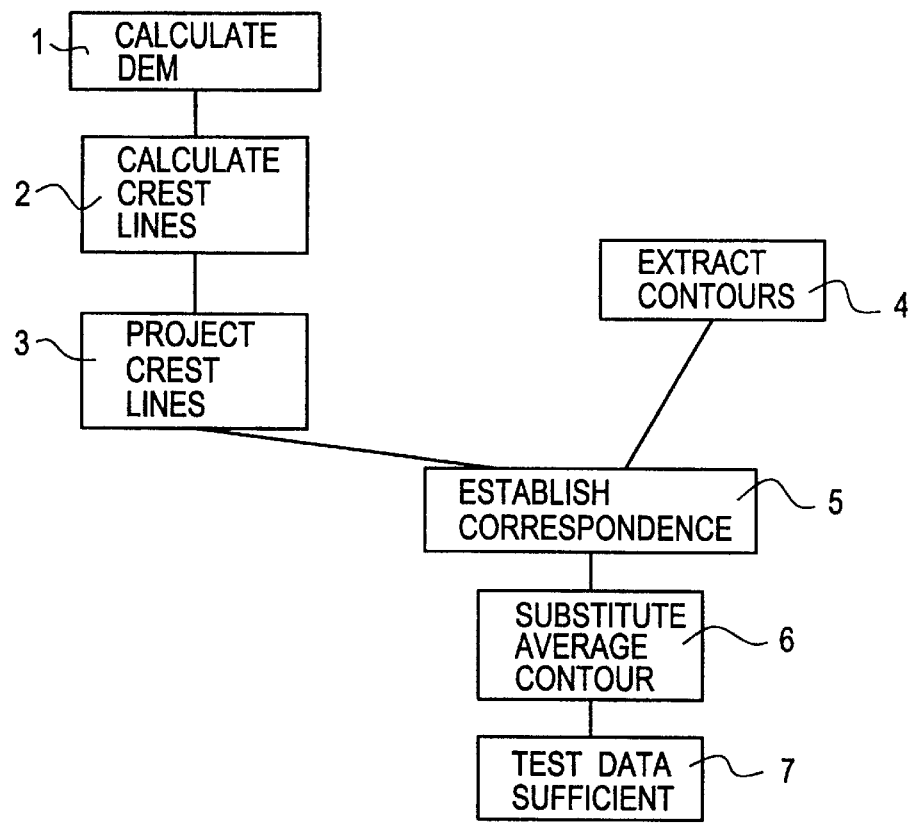
FIG. 1 is a flowchart illustrating the general architecture of the method.

Step 1 in FIG. 1 consists in calculating the digital elevation map.

Techniques of constructing digital elevation maps from a pair of stereoscopic images of the same terrain are known in the art. See for example: "Performance Evaluation of Scene Registration and Stereo Matching for Cartographic Feature Extraction" by Yuan C. Hsieh, David M. McKeown and Frédéric Perlant (published in IEEE Transactions on Pattern Analysis and Machine Intelligence, vol. 14, No. 2, February 1992) and "A System for Digital Stereo Image Matching" by Marsha Jo Hannah (published in Photogrармetric Engineering and Remote Sensing, vol. 55, No. 12, December 1989, pages 1765 to 1770).

Step 2 in FIG. 1 is applied to this digital elevation map and consists in calculating the crest lines. Note that the expression "crest line" must be understood in its widest sense, as. is usual in this art. The crest line must be understood as being a set of contiguous points representing a local curvature maximum.

Calculating crest lines is a difficult but standard problem in three dimensional imaging. Many documents describe a method of this kind, including "The Marching Lines Algorithm: new results and proofs" by Jean-Philippe Thirion and Alexis Gourdon, research report of the INRIA (Institut National de la Recherche en Informatique et Automatique) No. 1881 published in April 1993, or "Vision par ordinateur" by Olivier Monga and Radu Horaud, Traité des nouvelles technologies, Hermés informatics series, or "Crest lines extraction in volume 3D medical images: a multi-scale approach" by Olivier Monga, Richard Lengagne and Rachid Deriche, INRIA research report No. 2338 published in July 1994.

Step 3 of the algorithm consists in projecting the previously calculated crest lines onto the stereoscopic images. This step is a simple direct calculation because the stereoscopic images are assumed to be calibrated (i.e. it is assumed that the parameters of the projection of the points of the digital elevation map onto the images are known).

Step 4 extracts contours from the stereoscopic images, a process known as contour extraction (or contour segmentation step). Many techniques are available and the method of the invention is not limited to any particular technique. Mention may be made of the standard technique known as the Canny-Deriche (or Canny) method described in "Optimal edge detection using recursive filtering" by Rachid Deriche, published in First International Conference on Computer vision (pages 501–505) in June 1987 or in "Handbook of Image Processing Operators" by Reinhard Klette and Piero Zamperoni, published by John Wiley & sons, which summarizes the state of the art in contour segmentation, or the work by Radu Horaud and Olivier Monga previously cited.

This step conventionally includes a chaining and polygonalization phase with the result that the output data from step 4 forms a set of straight line segments.

It is important to note that step 4, on the one hand, and steps 1, 2 and 3 on the other hand, are not linked sequentially in any way. Accordingly, in terms of practical implementation of the method of the invention, step 4 can follow step 3 or each of steps 1, 2 and 3 or precede step 1, or run concurrently in a multitasking architecture.

Step 5 establishes the correspondence between the contours extracted in step 4 and the crest lines projected in step 3. It consists in calculating for each crest line a criterion of affinity of that crest line with each of the contours. The result of this step is a list of contours for which a correspondence with a crest line has been established in the sense of the affinity criterion.

The affinity criterion used can take various forms. Generally, it can be any criterion for measuring the resemblance between two straight line segments.

Figure 5:
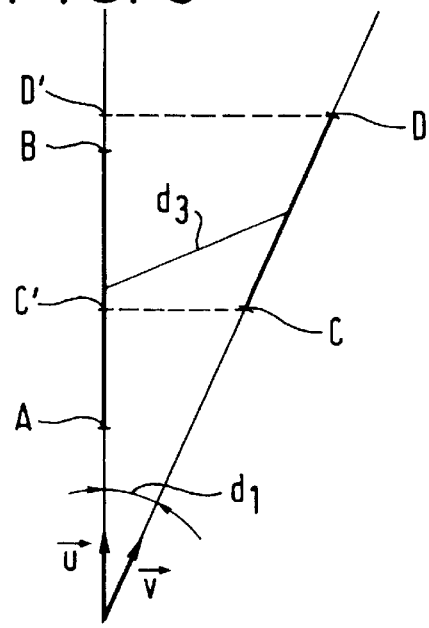
FIG. 5 represents the evaluation of an affinity criterion for establishing the correspondence of two segments.

FIG. 5 shows the method of evaluating the affinity between two segments in one particular embodiment of the invention but other criteria can be used without departing from the scope of the invention. In the embodiment described the affinity criterion is a vector of three scalar values: $(d_1, d_2, d_3)$.

The first value $d_1$ is representative of the difference in the orientation of the two segments. It is given by the following equation, for example:

$$d_1 = |\sin \theta| = \frac{\det(\overline{u} \cdot \overline{v})}{\|\overline{u}\| \cdot \|\overline{v}\|}$$

in which $\det(\overline{u}.\overline{v})$ is the determinant of the scalar product of the vectors $\overline{u}$ and $\overline{v}$, each of these vectors being the director vector of one of the two segments (AB and CD respectively).

The second value $d_2$ is the distance between the centers of the two segments concerned.

Figure 6A:
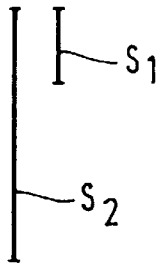
FIGS. 6a and 6b are two examples to illustrate the affinity criterion.
Figure 6B:
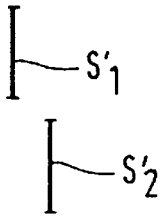
Figure 7:
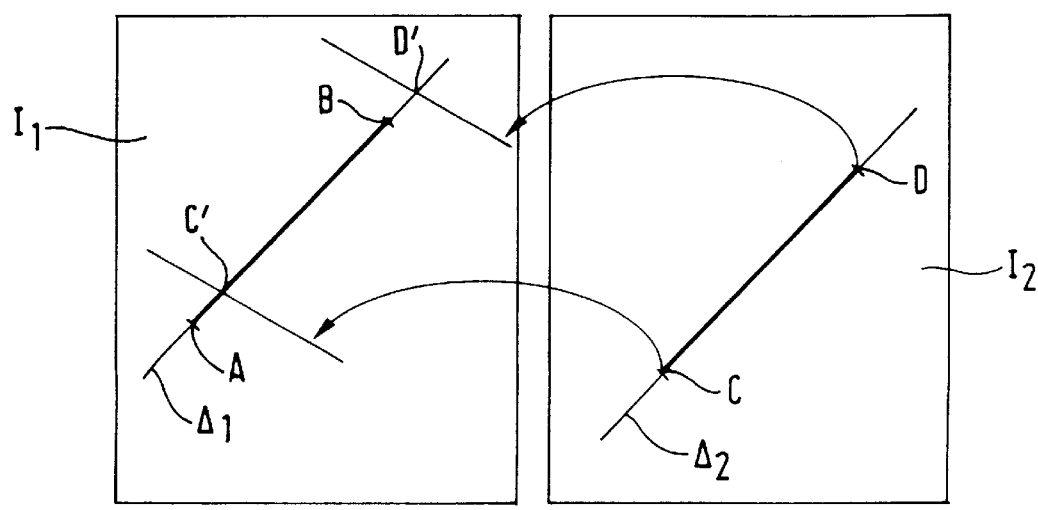
FIG. 7 represents a step of preparing to construct crest lines in one application of the invention.

A criterion formed of these first two values $d_1$ and $d_2$ is insufficient to characterize the affinity between two segments. FIGS. 6a and 6b show two situations that this criterion cannot distinguish correctly.

According to these first two criteria, the segments from FIG. 6b ($S'_1$ and $S'_2$) have a greater affinity that those from FIG. 6a ($S_1$ and $S_2$): the distance between the centers of the segments is less although the orientation is identical. However, intuition indicates that the affinity is greater for the segments from FIG. 6a because it is readily apparent that the segment $S_2$ corresponds to a "sub-detection" of segment $S_1$.

The third value $d_3$ refines the criterion and solves the problem referred to above by, so to speak, measuring the inclusion of one segment in another. It is given by the formula:

$$d_3 = \frac{\|AB \cap C'D'\|}{\|AB\|}$$

in which AB∩C'D' is the segment whose points are simultaneously elements of AB and C'D' where C'D' is the projection of the segment CD onto the straight line segment formed by AB. More generally the shorter segment (here CD) is projected onto the straight line segment formed by the longer segment (here AB).

From these values forming the affinity criterion it is possible to decide if a given contour corresponds to a crest line or not, for example by testing if each of the scalar values $(d_1, d_2, d_3)$ is below a particular threshold.

The contour is a relief contour if it is possible to establish this correspondence.

The step of establishing the correspondence between the contours and the crest lines yields a list of relief contours.

In one embodiment of the invention this step can be followed by an additional step (step 6 in FIG. 1) consisting in replacing all the contours for which a correspondence with a crest line has been established by an average contour.

Figure 3:
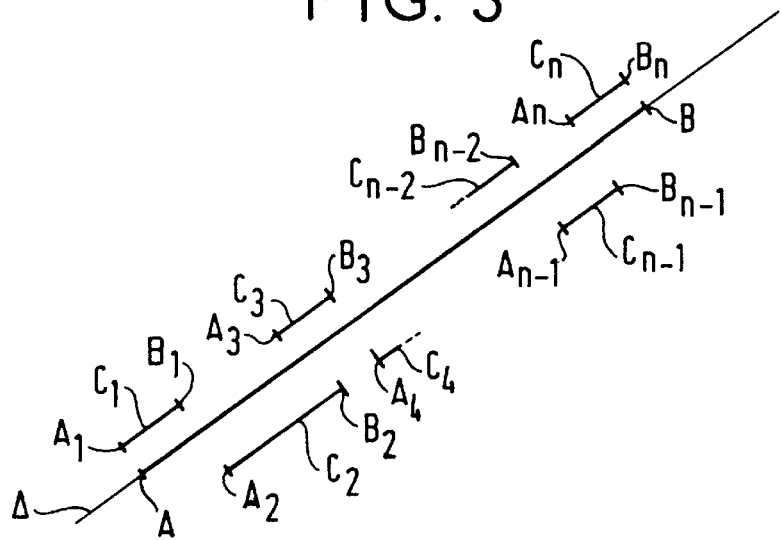
FIG. 3 shows an optional step of the method of the invention which consists in replacing the contours by an average contour.
Figure 4:
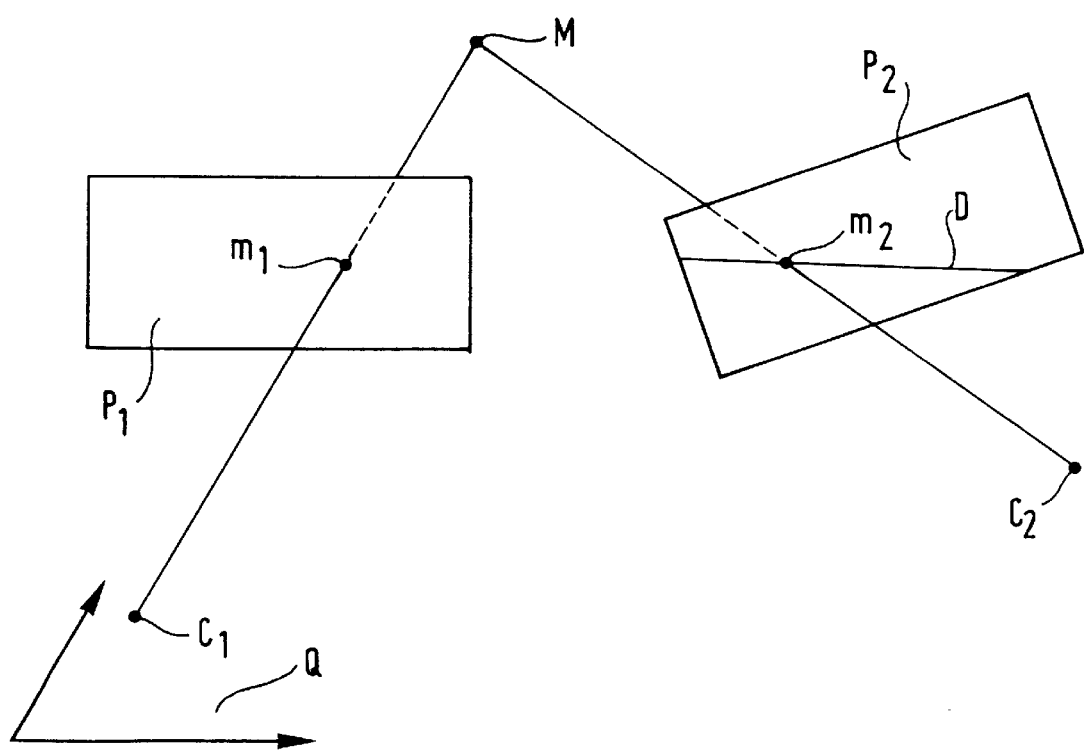
FIG. 4 illustrates the epipolar straight line segment concept.

FIG. 3 shows a method for doing this. It consists in tracing the straight line segment $\Delta$ that minimizes (for example in the least squares sense) the distance between it and the contours $S_1, S_2, \ldots, S_n$ for which a correspondence has been established with the same crest line and then delimiting a segment on this straight line segment by taking the extreme projections of the limits $A_iB_i$ of the contours. In FIG. 4 this segment is delimited by the points A and B.

As already mentioned, one application of the invention is a method of constructing crest segments in a digital elevation map with the same accuracy as the original images and not that of the digital elevation map.

The method described above can extract relief contours from stereoscopic images. All that remains is to construct from these contours crest segments on the digital elevation map. These crest segments can be generated directly given that the spatial coordinates of each of the points of the two images are known (because said images are assumed to be calibrated).

Hereinafter a distinction must be drawn between the crest lines which are calculated in step 2 of the method and have the same accuracy as the digital elevation map and the crest segments which have the same accuracy as the original images.

It may happen that a correspondence cannot be established between a contour of one image and a contour of the other image. This occurs in particular if the corresponding crest line is at least partially hidden in one of the images by the relief of the terrain. In this case it is impossible to generate a crest segment directly.

This problem can be solved by using an additional step (step 7 in FIG. 1) which consists in testing if the data is sufficient to generate a crest segment and, if it is sufficient, determining the crest segment from possibly incomplete data.

Generally speaking there are two possible situations for each contour of a processed image:

there is no corresponding contour in the other image: in this case it is not possible to generate a crest segment because the data is insufficient; or there is at least one corresponding contour in the other image: in this case it is possible to generate a crest segment.

However, in the latter case the crest line may be only partly masked, with the result that only a part of the crest segment can be constructed.

The method used to construct the crest segment consists in first selecting in each of the two images the part of the relief contour that actually corresponds to the relief contour of the other image and then constructing the crest segment from the contour parts selected in this way.

In order to select the pertinent part of the relief contour the epipolar straight line segment concept illustrated by FIG. 4 can be used with benefit.

A ground image is characterized by parameters including an imaging center $C_1$ or $C_2$ and a focal plane $P_1$ or $P_2$ onto which the viewed terrain is projected with a conventional pyramidal projection.

A point M on the terrain is projected at $P_1$ and P2 onto respective points $m_1$ and $m_2$. By construction it is known that the points M, $m_1$, $m_2$, $C_1$ and $C_2$ are in a common plane Q.

In the context of the invention the problem is to determine the locus of the points $m_2$ (respectively $m_1$) that can be the projection in $P_2$ (respectively $P_1$) of an unknown point M knowing its other projection $m_1$ (respectively $m_2$) and the viewing parameters (i.e. the imaging centers $C_1$ and $C_2$ and the focal plane $P_1$ and $P_2$) because, by hypothesis, the images are calibrated.

It is easy to deduce the coordinates in the plane Q of the positions of the three points $C_1$, $C_2$ and $m_1$ (respectively $m_2$) which are known. By construction, the point $m_2$ (respectively $m_1$) can only be on the intersection of the planes Q and $P_2$ (respectively $P_1$), both of which are known, i.e. on a straight line segment D that is called by definition the epipolar straight line segment.

Also, the end of a contour corresponds, in the other image, to the intersection of the corresponding contour and the epipolar straight line segment generated by said end. For example, in FIG. 5, the contour CD in the image $I_2$ corresponds to the contour AB in the image $I_1$. The end point D generates an epipolar straight line segment in the image $I_1$ that intersects the straight line segment generated by the segment BD at a point D'. This point, referred to hereinafter as the homologue of D, is the projection of the same point of the digital elevation map as D.

In a similar manner, the point C' is the homologue of point C.

The pertinent part of the contour AB is the intersection between AB and the segment formed by the homologous points of the corresponding contour CD. In the particular case shown in FIG. 5 this contour is C'B.

A possible alternative is to take the contour of maximal size, i.e. the union between AB and the segment formed by the homologous points of the corresponding contour CD (i.e. AD' in the case represented) even if little confidence can be put in a contour of this kind. The aim is then no longer to have accurate and reliable crest segments, but to the contrary extrapolated crest segments.

There is claimed:

1. A method of detecting relief contours in an image which is part of a digital elevation map formed from a pair of stereoscopic images of the terrain, which method includes the following steps:

calculating a digital elevation map from said pair of stereoscopic images, extracting crest lines in said digital map, projecting said crest lines into said image, calculating contours in said image, and deciding that a contour is a relief contour if the distance to the closest projected crest line, in the sense of a particular affinity criterion, is below a particular threshold.

2. A relief contour detection method as claimed in claim 1 including at the end of processing a step consisting in replacing the set of contours corresponding to the same crest line with an average contour.

3. The relief contour detection method as claimed in claim 1 wherein said affinity criterion consists in three scalar values, the first representing the distance between the middle of said contour and the middle of said crest line, the second representing the angle between said contour and said crest line and the third being given by the equation:

$$d_3 = \frac{\|AB \cap C'D'\|}{\|AB\|}$$

where AB is the longest segment from said crest line and said contour, C'D' is the projection on the straight line segment formed by AB of the longest segment from said crest line and said contour and AB∩C'D' is the segment whose points are elements of both AB and C'D'.

4. A method of constructing crest segments in a digital elevation map in which the relief contour detection method claimed in any one of the preceding claims is applied to each of said stereoscopic images and is followed by a step of generating said crest segments from said contours.

5. The crest segment construction method claimed in claim 4 wherein said crest segment generation step includes a step of replacing each contour of each of said stereoscopic images by the intersection between said contour and the segment formed by the homologous points of the corresponding contour in the other image.

* * * * *